US012798379B2

(12) United States Patent
Kamin et al.

(10) Patent No.: US 12,798,379 B2
(45) Date of Patent: Nov. 17, 2026

(54) METHOD FOR DISPLAYING AN INDIVIDUAL HOME SCREEN ON A DISPLAY DEVICE OF A VEHICLE AS WELL AS A CORRESPONDING DISPLAY DEVICE

(71) Applicant: MERCEDES-BENZ GROUP AG, Stuttgart (DE)

(72) Inventors: Jason Kamin, Half Moon Bay, CA (US); Daguan Chen, San Jose, CA (US); Claire Gu, Sunnyvale, CA (US); Hassan Benqassmi, Fremont, CA (US); Christopher Busenbark, Creedmoor, NC (US); Maja Buhr, Santa Cruz, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 205 days.

(21) Appl. No.: 18/293,019

(22) PCT Filed: Jul. 18, 2022

(86) PCT No.: PCT/EP2022/070007

§ 371 (c)(1),
(2) Date: Jan. 29, 2024

(87) PCT Pub. No.: WO2023/006466

PCT Pub. Date: Feb. 2, 2023

(65) Prior Publication Data

US 2024/0375517 A1 Nov. 14, 2024

(30) Foreign Application Priority Data

Jul. 30, 2021 (GB) ...................................... 2111015

(51) Int. Cl.
*B60K 35/29* (2024.01)
*B60K 35/10* (2024.01)
(Continued)

(52) U.S. Cl.
CPC .............. *B60K 35/29* (2024.01); *B60K 35/10* (2024.01); *B60K 35/22* (2024.01); *B60K 35/28* (2024.01);
(Continued)

(58) Field of Classification Search
CPC ........ B60K 35/29; B60K 35/10; B60K 35/22; B60K 35/28; B60K 2360/115;
(Continued)

(56) References Cited

U.S. PATENT DOCUMENTS

2015/0210287 A1 7/2015 Penilla et al.
2017/0064617 A1* 3/2017 Buttolo ................. B60R 16/037
(Continued)

FOREIGN PATENT DOCUMENTS

DE 102012223890 A1 * 6/2014 ............. B60K 35/81
DE 112012004773 * 8/2014 ............... G09G 5/00
(Continued)

OTHER PUBLICATIONS

Office Action dated Feb. 17, 2025 in related/corresponding JP Application No. 2024-504782.
(Continued)

*Primary Examiner* — Hitesh Patel
*Assistant Examiner* — Shien Ming Chou
(74) *Attorney, Agent, or Firm* — PATENT PORTFOLIO BUILDERS PLLC

(57) ABSTRACT

A first and second request are respectively received from first and vehicle components regarding a consideration for displaying respective first and second functionality symbol. A context cluster is determined using current context data of the vehicle. A current first rank for the first request component and a current second rank for the second request in the current context cluster are determined and compared. The individual home screen is displayed with the first function-
(Continued)

ality symbol having a higher priority than the second functionality symbol if the first rank is greater than the second rank, or vice versa. The first rank and second ranks are determined depending on a type and frequency of interaction performed by the user relating to the first and second vehicle components of the context cluster, respectively.

17 Claims, 4 Drawing Sheets

(51) Int. Cl.

| | |
|---|---|
| ***B60K 35/22*** | (2024.01) |
| ***B60K 35/28*** | (2024.01) |
| ***G06N 3/04*** | (2023.01) |
| ***G06N 3/08*** | (2023.01) |
| ***G06N 20/10*** | (2019.01) |

(52) U.S. Cl.

CPC ................. *G06N 3/04* (2013.01); *G06N 3/08* (2013.01); *G06N 20/10* (2019.01); *B60K 2360/115* (2024.01); *B60K 2360/151* (2024.01); *B60K 2360/186* (2024.01)

(58) Field of Classification Search

CPC ........ B60K 2360/151; B60K 2360/186; B60K 2360/11; B60K 2360/1442; B60K 35/00; B60K 35/20; B60K 37/00; G06N 3/04; G06N 3/08; G06N 20/10; G06N 20/00; B60Y 2400/92

USPC .............................................................. 701/35

See application file for complete search history.

(56) References Cited

U.S. PATENT DOCUMENTS

| | | | | |
|---|---|---|---|---|
| 2018/0121431 | A1* | 5/2018 | Shan | G06N 7/01 |
| 2020/0219466 | A1 | 7/2020 | Camhi et al. | |
| 2020/0257364 | A1 | 8/2020 | Strandberg | |
| 2020/0311119 | A1 | 10/2020 | Rönnäng et al. | |
| 2021/0382586 | A1* | 12/2021 | Bielby | G06F 3/0482 |

FOREIGN PATENT DOCUMENTS

| | | | | |
|---|---|---|---|---|
| DE | 102013207018 A1 | | 10/2014 | |
| EP | 1582393 B1 | * | 7/2008 | B60K 35/22 |
| EP | 3693841 A1 | | 8/2020 | |
| JP | 2018184115 A | | 11/2018 | |
| JP | 2019082856 A | | 5/2019 | |
| KR | 20190078703 A | * | 7/2019 | B60K 37/02 |
| WO | 2019111515 A1 | | 6/2019 | |
| WO | 2020025648 A1 | | 2/2020 | |

OTHER PUBLICATIONS

International Search Report and Written Opinion mailed Nov. 2, 2022 in related/corresponding International Application No. PCT/EP2022/070007.

Search and Examination Report dated Jan. 12, 2022 in related/corresponding GB Application No. 2111015.0.

* cited by examiner

METHOD FOR DISPLAYING AN INDIVIDUAL HOME SCREEN ON A DISPLAY DEVICE OF A VEHICLE AS WELL AS A CORRESPONDING DISPLAY DEVICE

FIELD OF THE INVENTION

Exemplary embodiments of the invention relate to the field of automobiles. More specifically, the exemplary embodiments of the invention relate to a method for displaying an individual home screen on a display device of a vehicle, wherein at least one functionality symbol is displayed on the home screen, as well as to a corresponding display device.

BACKGROUND INFORMATION

In the state of the art, it is known to cluster functionality in different applications and show a customer an overview of all applications with functionality hidden in submenus. Smartphones are an example of this. This, however, in a vehicle, in particular a motor vehicle, is a rather cumbersome and not very safe approach. A customer is expected to focus on driving while at the same time looking at the touchscreen to perform various clicks before reaching the action he wants to perform.

DE 10 2013 207 018 A1 relates to a motor vehicle with a display and an operating device comprising a display device for displaying selectable graphical objects, an input for receiving inputs from a user via which one of the displayed objects can be selected, and a control device for controlling the display device as a function of the received inputs, the control device being designed to assign a specific priority value to the displayed objects as a function of the received inputs and to set a size of the respective objects and/or an arrangement of the displayed objects with respect to one another as a function of the priority values during operation of the display and operating device.

U.S. Pat. No. 2,020,257 364 A1 discloses techniques for interacting with a vehicle touchscreen. According to one or more embodiments, a system is provided comprising a processor that executes computer executable components stored in at least one memory, including a display control component that selects graphical touch controls to include in a graphical user interface for rendering on the touchscreen based on activation of a haptic feedback mode for interfacing with the touchscreen, wherein the graphical touch controls correspond to controls for one or more applications or functions associated with the vehicle. The system further comprising a positioning component that determines a location of a finger on or over the touchscreen relative to the graphical touch controls as displayed on the touchscreen, and a haptic feedback component that causes a vibration unit of the vehicle to provide vibration feedback based on the location corresponding to a graphical touch control of the graphical touch controls.

SUMMARY OF THE INVENTION

Exemplary embodiments of the invention are directed to a method, as well as a corresponding display device, by which an individual home screen can be displayed in a more comfortable way on a display device of a vehicle.

One aspect of the invention relates to a method for displaying an individual home screen on a display device of a vehicle, wherein at least one functionality symbol is displayed on the home screen. At least a first request is received, which is generated by a provider associated with a first vehicle component, regarding a consideration for displaying a first functionality symbol of the first vehicle component. At least a second request is received, which is generated by a further provider associated with a second vehicle component, regarding a consideration for displaying a second functionality symbol of the second vehicle component. Determining a context cluster by current context data of the vehicle is performed. A current first rank for the first request of the first vehicle component in the current context cluster is determined and a current second rank for the second request of the second vehicle component in the current context cluster is determined. The first rank determined for the context cluster is compared with at least the second rank determined for the context cluster. The individual home screen assigned to the display device displays the first functionality symbol with higher priority than the second functionality symbol, if the given first rank is greater than the second rank, or vice versa. The first rank is determined depending on a type and frequency of interactions with the first vehicle component, and the second rank is determined depending on a type and frequency of interactions with the second vehicle component. Higher priority means e.g., if space for depicting is limited to show only one of the first or second functionality symbol, the symbol with higher priority will be shown and the other not. In another further embodiment, the priority is determined for a third, second and further functionality symbols.

Therefore, an individual home screen in the vehicle is displayed in a more comfortable way. Therefore, a necessary interaction with the head unit is reduced, and an easy access on the top level for all the desired, personalized functions and use cases is provided as far as possible. This is, in particular, done by the support of artificial intelligence, for example, a neural network. For example, the navigation map on the home screen is combined with a so-called magic dock. The magic dock is filled with the predictions from the artificial intelligence kernel to show the most desired functionalities at any given time based on learned user behavior within various contexts, for example, time, location, weather et cetera.

For example, the display device may comprise a user interface background with a dynamic global positioning system (GPS) map. Layered on top is, for example, a global search function along with the so-called magic dock at the bottom. An entertainment tile, shown in expanded form, can retract to the size of the smallest tile, or across the entire dock length if no suggestions are relevant. The size may be retracted if not in use and/or if there is only limited space, i.e., there is no space for showing an additional tile on the display area. In the sense of the application a tile is a functionality symbol associated with a vehicle component being operable by a user. The static phone tile, for example, follows if a phone is connected, followed by any active use case. Examples of active use cases could be an ongoing seat massage program, phone call or seat heating activity, directly providing the user with the option to immediately engage with the ongoing activity. Finally, there are personalized tile suggestions fueled by a novel artificial intelligence algorithm comprising a subset of the suggested use cases that the system has learned, the customer cares about in a given context situation.

The display device is configured to show a context-aware, personalized subset of functionalities, which may also be regarded as use cases, on the home screen. This allows for easy and quick access while limiting distraction for the customer throughout their driving journey. As a result, the driving environment becomes much safer, and the customer enjoys a more pleasant and less stressful user experience. The use cases are predefined sets, but can be expanded with additional use cases from a backend or over-the-air updates. Additionally, the contextual features considered by the artificial intelligence are a predefined set but are also expandable over-the-air updates to the head unit/display device.

In particular, a context cluster refers to a specific set of values of contextual features respectively data based on time, location, temperature, weather, day, week and/or other environmental conditions. A default rank is given to each of the use cases to define its importance. An evolving rank associated with each use case changes over time as the artificial intelligence learns. Use cases will evolve different ranks for each context cluster that is learned. Higher ranking use cases hold priority over lower ranking ones. Use cases can also be considered to be functions of the vehicle. These are the functions the artificial intelligence kernel suggests to the customer.

According to an embodiment, the request of the first vehicle component and/or the second vehicle component is only generated by the providers associated with the first and/or the second vehicle component, if a predetermined rule is fulfilled. For example, the rule may be that a predetermined speed limit is not exceeded. For example, if the context is a parking context, the speed limit has to remain under a certain value, wherein the functionality symbol associated with Parktronic i.e., with a component working as a park assistant may be displayed on the display device. In particular, for example, the function of a Parktronic may only be used, when the vehicle drives below a certain speed limit. This means it only makes sense for the Parktronic as the use case when this requirement is fulfilled. Differing from these kinds of rule depending on request, some vehicle function generate permanent requests independent from any rule, e.g., a music streaming service, a weather forecast app, a system setting function etc. The vehicle functions generating permanent requested are available all the time, the rule based requests only in specific situations.

The probability for using a vehicle component is used for generating an associated rank. In particular, the user interaction is the primary consideration influencing the learning. The user can interact with a use case via the home screen, for example, providing positive feedback, temporarily discard it, for example, which means negative feedback, or simply not interact with it, which may be regarded as a neutral feedback. Further, the user may choose to interact with a specific use case that is not shown on the home screen via the application menu, navigating on the home screen via the application menu, navigating the user interface by perusing through sub-menus. The display device also considers this as a positive reinforcement for the use case, and this will directly impact the ranking as well. Every time the user interacts with a use case supported by the display device, the model is trained with that data and the corresponding kernel is updated.

In another further developed embodiment, the first and second rank are determined by using evolving beta distributions having increasing or decreasing mean value, whereby the mean value is associated or at least corresponds with the rank. In particular, as the kernel learns, the assumed values of the rank within each class, evolve, i.e., are increasing or decreasing depending on the interaction of the user with a vehicle component via a functionality symbol or selection menu depicted on a display. These qualities are modelled as beta distributions meaning either a customer engages with the use cases or does not, and are subsequently parameterized by the conjugate prior beta distribution. The beta distribution directly represents the kernel's belief over the probability that the use case will be engaged by the user. These priors evolve as the kernel observes the customer's engagement or non-engagement of each user case inside each cluster. Evolving of the beta distribution is performed by updating parameters $\alpha$, $\beta$ used for mean calculation of the beta distribution ($mean=\alpha/(\alpha+\beta)$) according predefined rules depending on type of interaction. The rules are stored as a look up tables stored in a memory of the display device or calculated by appropriate algorithms. Interaction types are a click on a symbol, a swipe away of a symbol, no interaction with a provided symbol, and/or activating by means of a sub menu, wherein each interaction is assigned an updating parameter evolving prior values of $\alpha$ and $\beta$.

In another embodiment, the first rank and the second rank are determined in predetermined time steps and/or the comparison is performed in predetermined time steps and/or the determining of the current context cluster by context data of the vehicle is performed frequently in predetermined time steps. This may also be called a timer check. If the use case passes the setting check, a timer check occurs. The timer has two purposes. It ensures that the home screen is not updated too frequently and also that the artificial intelligence check is performed in certain intervals if no new use case donations are made, but the context changes. If the timer check passes and an update can be considered for the home screen, a request or predict call is made to the context clusterizer in ranking algorithm.

According to another embodiment, displaying of the first functionality symbol and/or the second functionality symbol is suppressed depending on an input by a user of the vehicle. This may also be regarded as a veto list. In particular, a time check is performed against this veto list. The user has an option to veto for specific use cases, which means the user can ask for these use cases never to be shown again. This veto list can only be reset if all history and learning is reset. Use cases that are swiped away on the user interface are vetoed, i.e. ignored for the duration of the trip. Use cases that are permanently vetoed in the settings will not be shown as long as the settings entry is turned off. In a further embodiment displaying of the first functionality symbol and/or the second functionality symbol is suppressed as long as the rank for the requests of associated vehicle components falls below a predefined threshold. The threshold prevents showing symbols not being interesting for the user and avoids unnecessary driver distraction.

In another embodiment, each context cluster comprising one or several types of vehicle component requests refers to a subset of contextual features. A vehicle component request in the cluster with an assigned rank stands for a function of a component that can be requested by a provider automatically or initiated by a user. These contextual features may be weather, the vehicle navigation state, speed, or time. In particular, these contexts may be assigned to environmental conditions. In particular, the display device receives input and learns from various sources. Primary inputs are environmental contextual features, for example, time, location, and weather. However, other inputs include behavioral contexts, for example, navigation state, seat heater use, passenger in vehicle or furthermore. As the user interacts with the various use cases, the display device learns which contexts matter for which use cases and the appropriate rank values for each context set. These specific individualized context sets are called clusters and form the basis for which the ranking algorithm may be applied. Within each cluster, the individual use case rankings are continually updated and stored leading to an accurate prediction based on a large variety of contextual situations.

According to another embodiment, the context clusters are established by training, preferably by training a neural network or other known machine learning techniques known from state of the art. In particular, therefore the display device comprises a neural network or other machine learning techniques. Therefore, an individual training of the display device may be realized.

In another embodiment, within each context cluster ranking of the vehicle component requests are stored and evolved individually. In particular, the same requests may be implemented in several context clusters. Context clusters refer to a subset of contextual features, e.g., time and location. One context cluster could refer to morning time and home location, the other one to lunchtime and office location. In both cases, the same request e.g., one of a phone calling system or a notification of time scheduler.

In a still further embodiment, multiple context clusters are arranged in cluster ensembles, whereby each cluster ensemble is processed in a separate kernel in parallel with the other cluster ensembles. In particular, to improve the overall accuracy and thereby the user experience, an ensemble of the learning kernels are developed in parallel as a full model running in a single vehicle. Each kernel of a controller comprised by the display device simultaneously operates on a subset of different contextual features and the results are combined for a final use case suggestion list. This ensemble model simultaneously addresses concerns revolving around missing contextual features, for example, glitches resulting in input signals never being sent or lost, as well as allows for pretraining of a generic base model appropriate for most/all users leading to desirable and intuitive suggestions immediately in a new user profile's life cycle.

The kernel is composed of cluster ensembles that are trained and built up in parallel. Each cluster ensemble is composed of clusters based on a subset of contextual features assigned to the cluster ensemble. For instance, one cluster ensemble might build up its clusters based on contextual features of times of day and location and another cluster ensemble based on day of the week and location, a further cluster ensemble based on weather, temperature, and location and so forth. The clustering that is built on each one of these cluster ensembles are independent of each other. Clustering of context clusters and ranking of requests associated with vehicle components is done independently, in parallel to other cluster ensembles at the same time by training on each data point. Therefore, context clusters and rankings of requests associated with vehicle components formed on each cluster ensemble can be completely different from another. For instance, for the example of parking, there will be different rankings of a request for a vehicle component and associated symbol, e.g. Parktronic, For this vehicle component in clusters of different cluster ensembles, for instance we may get for one cluster ensemble ranking of 0.7 and for another one 0.3.

When doing inference based on a given context one can find an appropriate or at least the closest cluster within each cluster ensemble, and based on that find the ranking within that cluster. Then, for k cluster ensembles, there will be k rankings with each ranking coming from a different cluster ensemble.

In order to calculate the final ranking for each request of a vehicle component, we need to average its rankings in different cluster ensembles. In a further embodiment each cluster ensemble has a weight associated with it, therefore this will be a weighted averaging giving a higher weights for rankings by cluster ensembles with a higher importance. Preferably these weights are tuned based on evaluation on a large, simulated data (containing of over 800 datasets) that were generated based on different story scenarios, and the weights that resulted in the best average performance on all of these datasets, based on accuracy metrics, are selected.

In another embodiment, on the home screen at least one static functionality symbol of a further vehicle component is additionally displayed, wherein the static functionality symbol is displayed always in a non-adaptable manner or at least in an adaptable manner. For example, the static functionality symbol may be a navigation card, which is always shown. In particular, the first functionality symbol and the second functionality symbol may then be shown in a highlighted manner. Therefore, functionalities, such as the navigation or, for example, a phone call, are always shown, as they are important functionalities. The static functionality symbol of a further vehicle component is adapted in size, that a symbol associated with a further vehicle function requested by a provider with higher rank than the predefined threshold can be shown on the display area with limited space. In this case, the static functionality symbol is shrunk to make an area available for displaying a further functionality symbol e.g. the first and/or second functionality symbol. Functionality symbols beside static functionality symbols are shown in order of priority until the display area is fully occupied, further functionality symbols are refused.

A still further aspect of the invention relates to a display device of a vehicle for displaying an individual home screen, wherein at least one functionality symbol is displayed on the home screen, the display device comprising at least one electronic computing device, wherein the display device is configured for performing a method according to the preceding aspect. In particular, the method is performed by the display device.

A still further aspect of the invention relates to a vehicle, in particular a motor vehicle, comprising the display device. The display device comprises electronic means, for example, processors integrated circuits and further electronic means, for performing the method.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The novel features and characteristic of the disclosure are set forth in the appended claims. The accompanying drawings, which are incorporated in and constitute a part of this disclosure, illustrate exemplary embodiments and together with the description, serve to explain the disclosed principles. The same numbers are used throughout the figures to reference like features and components. Some embodiments of system and/or methods in accordance with embodiments of the present subject matter are now described below, by way of example only, and with reference to the accompanying figures.

The drawings show in.

DETAILED DESCRIPTION

Figure 1:
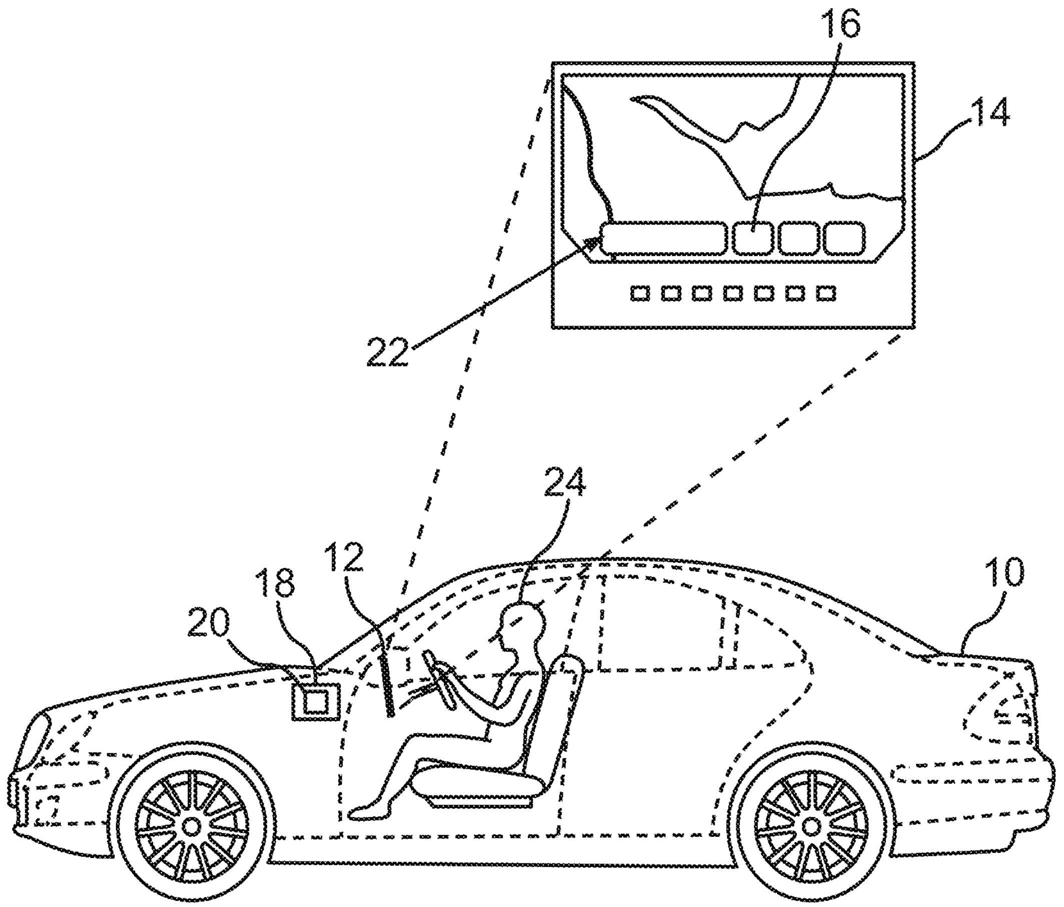
FIG. 1 a schematic side view according to an embodiment of a motor vehicle with an embodiment of a display device.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device, or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiment of the disclosure, reference is made to the accompanying drawings that form part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a schematic side view according to an embodiment of a motor vehicle 10 comprising a display device 12. In particular, the display device 12 is for displaying an individual home screen 14, which is shown in an enlarged view. At least one functionality symbol 16 is shown on the home screen, wherein the display device 12 comprises at least one electronic computing device 18. In particular, the electronic computing device 18 may comprise an artificial intelligence, in particular at least one kernel 20 and/or a plurality of kernels 20.

In particular, the home screen may, for example, show at least one static functionality symbol 22 which may be, for example, a navigation screen and/or a tile for a phone call. In particular, a set of functionalities is provided to a user 24 of the motor vehicle 10 and/or the display device 12, wherein the static functionality symbol 22 is provided on the entertainment module, for example, a static phone module, active tiles that are always shown when the user 24 is performing certain actions as well as suggested functionalities based on the artificial intelligence learning. The persistent user interface background, which is shown as the dynamic global positioning (GPS) map is shown in FIG. 1. Layered on top is, for example, a global search function as well as the so-called magic dock at the bottom, which is, for example, the first functionality symbol 16 or the second functionality symbol 16.

The entertainment tile, shown in the expanded form, can retract to the size of the smallest tile, or across or almost across the entire dock length, if no suggestions are relevant. The static phone tile follows if a phone is connected, followed by any active use case. Examples of active use cases could be an ongoing seat massage program, phone call or seat heating activity, directly providing the user with the option to immediately engage with the ongoing activity. Finally, there are personalized tile suggestions fueled by the electronic computing device 18 comprising a subset of the suggested use cases that the system has learned the user 24 cares about in a given context situation.

In particular, a context cluster 26 (FIG. 2) refers to a specific set of values of contextual features based, for example, on time, location, and other environmental conditions, for example, weather, vehicle, and navigation state. Context clusters 26 are arranged within a cluster ensemble 62 of the learning kernel 20, wherein in the learning kernel several cluster ensembles 62 are working in parallel. A subset of contextual features 33 is assigned to each cluster ensemble, wherein context clusters 26 within each cluster ensemble 62 are learned based on these subsets of contextual features 33. To donate in this context means that a provider, which may be, for example, a vehicle component 28 (FIG. 2) or an associated electronic module of a vehicle component assigned to the display device, informs the electronic computing device 18 that its use case(s) should be considered to be shown on the home screen 14 by a request. Some examples for vehicle components are an energizing coach, a seat heater, a parking assistance system, a phone, a massage, a navigation system, etc. A donation may be permanent for the entire duration of a drive or it may be limited by certain rules for only a certain time. Vehicle components 28 or associated electronic module, which may be also called the providers, contribute their use cases to the electronic computing device 18 for consideration. They can donate their use case or retract a donation at any given moment. Each application has one provider for their use case set. Each application may have a rank 30. In particular, a default rank 30 is given to each use case to define the importance of a use case. The rank 30 changes over time as the electronic computing device 18 learns. Use cases will evolve different ranks 30 for each context cluster 26 that is learned. Higher ranking use cases hold priority over lower ranking ones. The vehicle component 28 has the option to remove their donation to be considered for the home screen 14. This retraction usually happens when a use case depends on certain requirements to be carried out, for example, when the vehicle transmission changes from park to drive, the trunk-opening tile might be retracted. Use cases can also be considered functions of the vehicle 10. These are the functions the electronic computing device 18 wants to suggest to the user 24.

Figure 2:
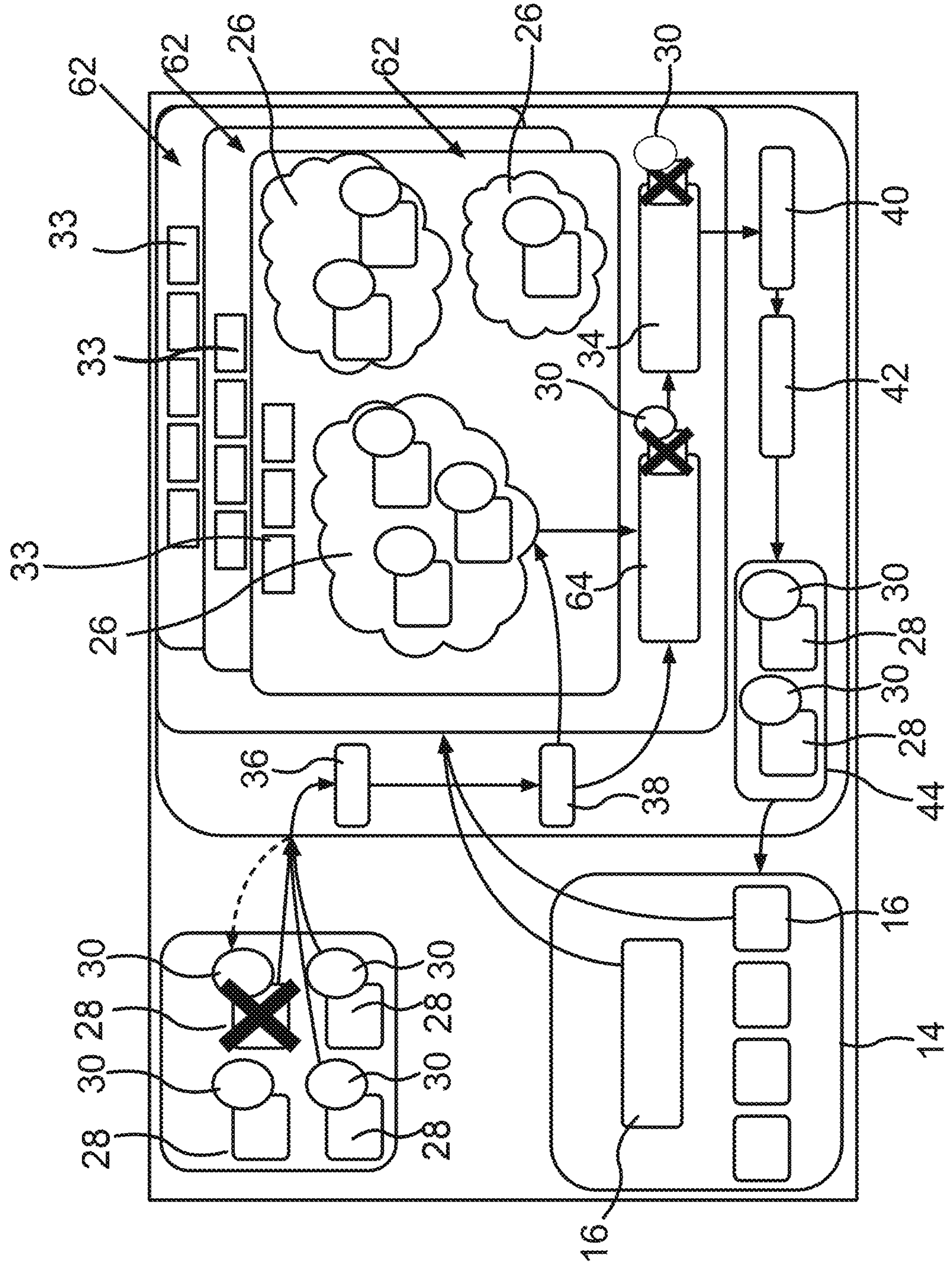
FIG. 2 a schematic flow chart according to an embodiment of the method.

FIG. 2 shows a schematic flow chart according to an embodiment of the method. In particular, FIG. 2 shows that the method for displaying the individual home screen 14 comprises the step of receiving at least a first request from a first vehicle component 28 regarding a consideration for displaying its first functionality symbol 16. Furthermore, receiving at least a second request from a second vehicle component 28 regarding a consideration for displaying a second functionality symbol 16 is performed. The context cluster 26 is determined by the current context data of the vehicle. A current first rank 30 for the first request of the first vehicle component 28 and the current context cluster 26 is determined, and a current second rank 30 for the second request of the second vehicle component 28 in the current context cluster 26 is determined. The first rank 30 and the second rank 30 are compared in a comparison module 34. The individual home screen 14 is displayed with the first functionality symbol 16 having higher priority if the given first rank 30 is greater than the second rank 30, or vice versa. In the case, that due to limited space only one functionality symbol can be displayed, this one with lower priority is disregarded.

The first rank 30 is determined depending on a number and type of interactions of uses relating to the first vehicle component 28 of the context cluster 26 and the second rank 30 is determined on a number and type of interaction of uses relating to the second vehicle component 28 of the context cluster 26.

In particular, the flow of the electronic computing device 18 is illustrated in the FIG. 2. First, use cases need to be donated through electronic modules associated with the vehicle components 28. Each application, also known as provider, donates their specified use cases to the electronic computing device 18, in particular to the kernel 20, to be considered for the home screen 14. The providers donate the use cases at a start up and always leave it up for consideration, or they can choose to donate based on specified rules and retract the use cases if the rules no longer apply. An example for the latter would be a Parktronic Plus (PTS) use case. The function can only be used when the vehicle 10 drives below a certain speed limit, so it only makes sense for the provider to donate the use case when this requirement is fulfilled.

When a use case has been donated to the electronic computing device 18, the kernel 20 first checks customer settings 36. The customer settings 36 or user settings allow the user 24, profile specific, to select which use cases, if any, they want the system to learn about and show on the home screen 14 and which ones they want to be disregarded. The initial settings 36 cover use cases for phone, navigation, comfort, vehicle, in-car office, and online speech services.

If the use case passes the settings check, a timer 38 check occurs. The timer 38 has two purposes. It ensures that the home screen 14 is not updated too frequently and also that the electronic computing device 18 check is performed in certain intervals if no use case donations are made, but the context changes. If the timer 38 check passes and an update can be considered for the home screen 14, a request or predict call is made to the context clusterizer and ranking algorithm. The clusterizer determines which of the learned environmental context categories is most appropriate for the current conditions and, coupled with the internal ranking algorithm, provides prioritized feedback on which use cases should be suggested to be shown. Only donated use cases are considered. The clusterizer receives input and learns from various sources. Primary inputs are environmental contextual features, for example, time, location, and weather. However, other inputs include behavioral contexts, for example, navigation state, phone use, or passengers in vehicle. As the user 24 interacts with the various use cases, the electronic computing device 18 learns which contexts matter for which use cases and the appropriate rank values for each context set. These specific individualized context sets are called clusters 26 and form the basis for which the ranking algorithm may be applied. Within each cluster 26, the individual use case rankings are continually updated and stored leading to an accurate prediction based on a large variety of contextual situations.

After the clusterizer's performance, a check is performed against a veto list 40. The user 24 has an option to veto specific use cases, which means the user can ask for these use cases never to be shown again. In an exemplary embodiment this veto list 40 can only be reset if all history and learning is reset. Use cases that are swiped away on the display device 12 are ignored only for the duration of the trip, means a check against a temporary ignore list 42 is performed. Use cases that are permanently vetoed in the settings will not be shown as long as the setting entry is turned-off.

Once the use case has passed the veto list check, a final comparison 44 is made between the rank 30 of the use case and a default rank as a predefined threshold e.g., given by the static entertainment use case. If the donated further use case ranks equal or higher as the static default rank, it is shown on the home screen 14 to the user 24 with a functionality symbol. If it is ranked lower as the static default rank, then it will not be shown, and the entertainment module will remain expanded.

In particular, the user interaction is the primary consideration influencing the learning process. The user 24 can interact with a use case via the home screen 14, for example, providing positive feedback, temporarily discard it, for example, which means negative feedback, or simply not interact with it, which may be regarded as a neutral feedback. Further, the user 24 may choose to interact with a specific use case that is not shown on the home screen 14 via the application menu, navigating the display device 12 by perusing submenus. The electronic computing device 18 also considers this so called Long-Way-Access as positive reinforcement for the use cases, and this directly impacts the learned ranking within associated context clusters as well. In other words, with every activation of a requesting vehicle component e.g., by a menu or submenu of a head unit, this request will be ranked higher, even an associated symbol is not shown on the display. As soon as the rank is high enough, the associated symbol will appear on the display providing an enhanced ease of use. Every time the user 24 interacts with a use case supported by the electronic computing device 18, the model is trained with that data and the electronic computing device 18 is updated.

The rank 30 is the fundamental keystone to the decision-making process inside the electronic computing device 18. Each use case starts off with an initial rank 30, which may be considered as the cold-start priors. The rank 30 defines the relative importance of one use case compared to another. The learned rank 30 will grow larger when the user 24 engages with a use case more often. The rate at which the estimated rank 30 can change depends on type of interaction. The electronic computing device 18 learns, the assumed values of the rank 30, in particular the priors, within each cluster evolve. These quantities are modelled as beta distributions 46 shown in FIG. 3, which means either the user 24 engages with the use case or does not. The beta distribution directly presents the kernel's belief over the probability that the use case will be engaged by the user 24. These priors evolve as the kernel 20 observes the user's engagement or non-engagement for each use case inside each cluster.

Figure 3:
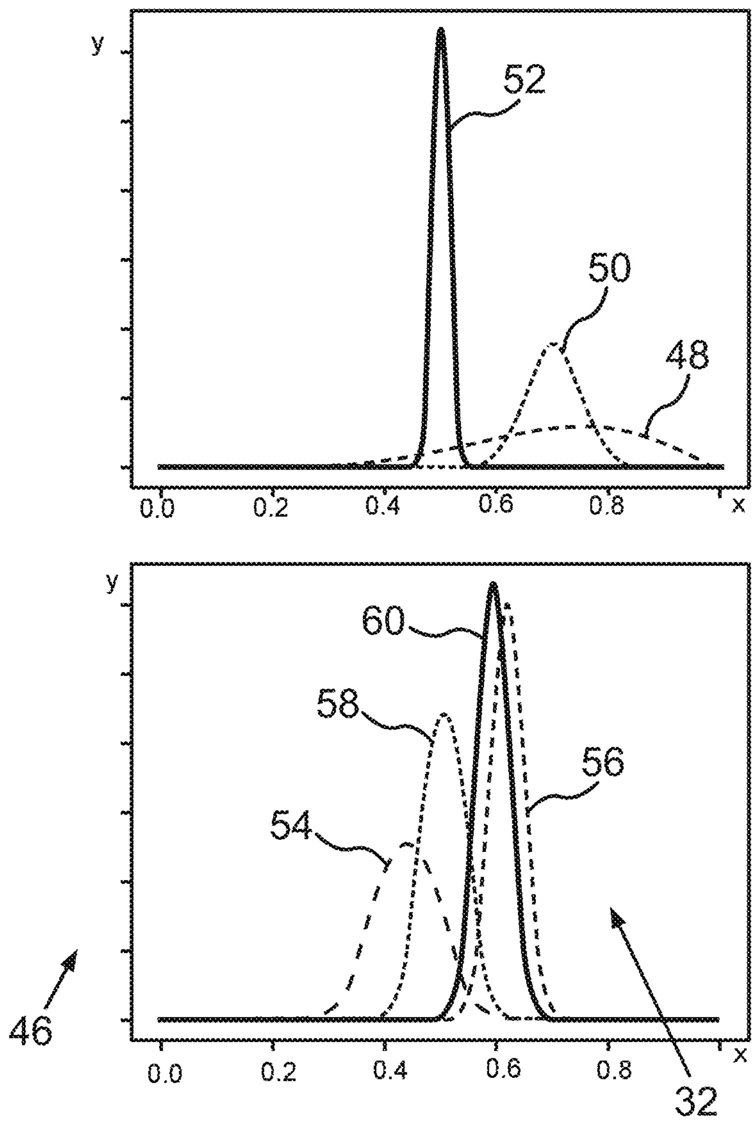
FIG. 3 two schematic diagrams according to an embodiment for determining weights.

FIG. 3 shows two diagrams for determining the ranks. The beta distributions, which are shown, represent the distribution over probabilities of a particular action being taken. The top panel of FIG. 3 shows three examples of beta distributions, highlighting how the mean of the distribution corresponds to unnormalized rank 30. These probability distributions are examples of the full information content stored in a set of beta parameters for a specific use case within a specific cluster. For the sake of illustration, a first curve 48 represents a belief that our best guess of the estimated probability that the user 24 would interact with a use case, is, for example, 70%, represented by a mean value of 0.7 shown on x-axis. The probability is corresponding to the rank, wherein high probability means high rank. The mean value is characterized by mean=$\alpha/(\alpha+\beta)$ with $\alpha$, $\beta$ as beta parameters. In case of curve 48 is $\alpha$=7 and $\beta$=3. However, the confidence we have in that number is somewhat low, which is represented by the large width and low height, i.e., high variance of the first curve 48. In other words, the confidence is associated with the width, the width associated with the height of the graph, wherein a corresponding value to the height is shown on y-axis. Alternatively, a peak of a second curve 50 ($\alpha$=70 and $\beta$=30) has the same mean of 70%, but the confidence in that value is much stronger, represented by the narrow width and higher height i.e., small variance. Finally, a third curve 52 ($\alpha$=800 and $\beta$=800) illustrates an example, whether the confidence level is very high in the estimation of the probability of 50%. User behavior/action history is parameterized in beta distributions. Each tile/action has its own base priors for the beta parameters. Over time, as user interacts, beta parameters within a context cluster are updated, ranks are evolving thereby.

To elaborate on how the priors evolve with more observations of the user engagement, the lower panel of FIG. 3 shows an initial prior in a fourth curve 54 characterizing an initial assumption of about 45% probability of the user engaging with the use case, but the wide width of the curve illustrates, that the kernel 20 is not very confident about this prior assumption. A fifth curve 56 distribution is the true probability distribution of a user engagement. Over time, as the kernel 20 observes the user behavior, it begins to learn an update of its estimation of the probability. This is shown in a sixth curve 58 and a seventh curve 60, which are moving closer and closer to the true distribution and so the fifth curve 56. Depending on type of interaction $\alpha$ and $\beta$ are updated. For example, an interaction as a click increases $\alpha$ by +1, $\beta$ remains unchanged, a long way access increases $\alpha$ by +5, $\beta$ remains unchanged. A neutral interaction increases $\beta$ by +1, a swipe away action increases $\beta$ by +5, in both cases a stays unchanged. In order to adapt the change degree of $\alpha$ and $\beta$ to different applications, these can be parameterized via software.

Figure 4:
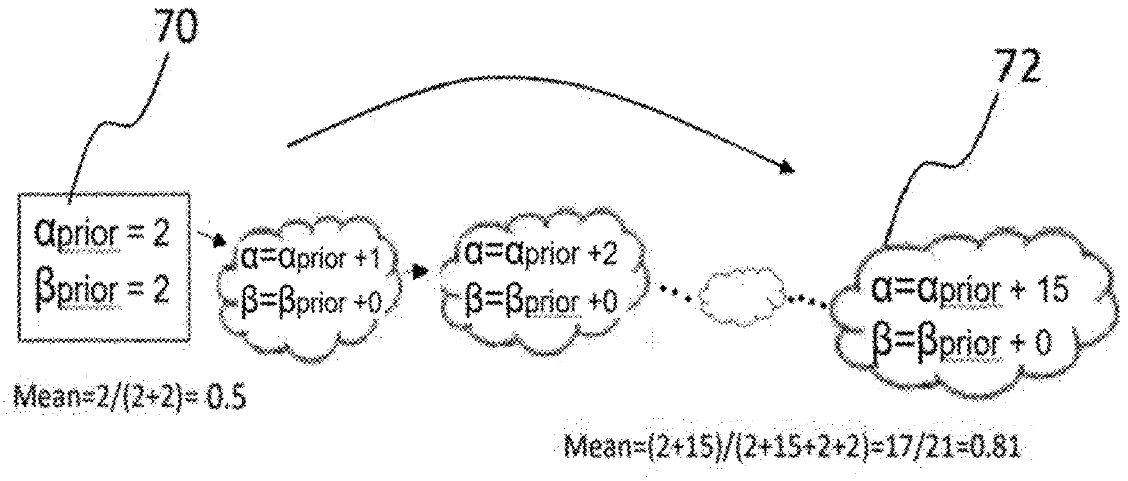
FIG. 4 an example for evolving rank of a request of a vehicle component; and In the figures the same elements or elements having the same function are indicated by the same reference signs.

An example for an evolving rank, which is associated with a mean value, is shown in FIG. 4. Starting from a prior state 70 having a mean value of 0.5 (Mean=2/(2+2)=0.5), an interaction with a vehicle component is carried out for 15 times. In this case the interaction is a click on a tile, e.g., a radio tile. With each interaction prior values are updated, $\alpha$ increases by +1, $\beta$ remains unchanged. At the end state 72 current value for $\alpha$ is 17 and $\beta$ still 2. The mean value starting from 0.5 is now 0.81 (Mean=(2+15)/(2+15+2+2) =17/21=0.81), which gives a request of the vehicle component a much higher priority than before.

To make suggestions about what use cases to actually show in the home screen 14 interface, the kernel 20 calculates the probability distributions for all available use cases. If an expected probability value is below the value of the media tile, that use case is discarded, in other words, if the rank corresponding to the probability is below a default rank associated with the use case, this one will be discarded. The remaining probabilities are normalized and compared to construct an ordered list of suggestions. The top suggestions are displayed in the user interface, in particular on the display device 12. An example of balancing the initial ranks 30 may be found by comparing the missed called use case and the Parktronic use case. Assuming that user data are aggregated that says that the user 24 engages with each of these use cases with equal probability, for example, 70% of the time. However, there is a much larger variation in that probability for Parktronic, while the mean of probability is still 70%, many people engage Parktronic nearly every time, while others engage quite rarely. Due to a high spread confidence is low and an initial beta distribution with large width is applied to the Parktronic use case. On the other hand, a vast majority of the users 24 check their missed calls, in particular upon notification, for example, 70% of the time, and therefore having a high confidence, missed calls would get a beta distribution with narrow width is applied. The confidence in the belief of the missed calls 70% value is stronger than the confidence in the Parktronic 70% value. Incidentally, this example could be the first curve 48, for example, Parktronic, and the second curve 50, for the missed calls.

The rank 30 of each use case changes based on the user's interaction with the display device 12 and are independently stored for all clusters. Within a cluster, the ranks 30 individually evolve to create a fully personalized user experience. Use case ranking updates by means of evolving $\alpha$ and $\beta$ can make the ranks 30 either larger or smaller, depending on the behavior. Without any additional inputs, the learned ranks 30 eventually degrade back towards the initial default values.

The combination of the clusterizer and the ranking algorithm comprises the single learning kernel 20. To improve the overall accuracy and thereby the user's experience, an ensemble 62 of learning kernels 20 are deployed in parallel as the full model running on a single vehicle 10. Each kernel 20 simultaneously operates on a subset of contextual features with a specific set of parameters, and the results are combined for a final use cases suggestion list, which is shown by the block 64. The ensemble model simultaneously addresses concerns evolving around missing contextual features, for example, glitches resulting in input signals never being sent or lost, as well as allows for pretraining of a generic base model appropriate for most/all users 24 leading to desirable and intuitive suggestions immediately in a new user profile life cycle.

As a use case, for example a phone call, may be presented. Another use case may be a comfort use case, for example, massage, heating control, energizing comfort program, air defense, energizing activation program, or power nap. Another use case may be a navigation case, wherein the last, favorite and/or predicted destinations may be presented. Another use case may relate to the vehicle, for example, a trunk control, comfort doors control, vehicle level adjustment or the Parktronic use case. Further in-car office may be a use case, which may be, for example, call lists and birthdays. Furthermore, online speech services may be a use case, for example, for food ordering or the like. These presented use cases are just examples.

The contexts considered by the kernel 20 may include the local time, time boot, GPS, inside temperature, outside temperature, air quality, passengers in the vehicle, speed, navigation guidance status, estimated time of arrival, drive state, seat heating status, and time since last application use. These contexts will be updated and added.

The invention claimed is:

1. A method for displaying an individual home screen on a display device of a vehicle, the method:
receiving at least a first request generated by a provider associated with a first vehicle component regarding a consideration for displaying a first functionality symbol of the first vehicle component;
receiving at least a second request generated by a further provider associated with a second vehicle component regarding a consideration for displaying a second functionality symbol of the second vehicle component;
determining a context cluster using current context data of the vehicle;
determining a first rank for the first request of the first vehicle component in the context cluster and determining a second rank for the second request of the second vehicle component in the context cluster;
comparing the first rank with at least the second rank determined for the context cluster; and
displaying the individual home screen assigned to the display device with
the first functionality symbol having a higher priority than the second functionality symbol responsive to the first rank being greater than the second rank, or
the second functionality symbol having a higher priority than the first functionality symbol responsive to the second rank being greater than the first rank,
wherein the first rank is determined depending on a type and frequency of interaction performed by a user relating to the first vehicle component of the context cluster, and
wherein the second rank is determined depending on a type and frequency of interaction performed by the user relating to the second vehicle component of the context cluster.

2. The method of claim 1, wherein the at least one first request of the first vehicle component or the at least one second request of the second vehicle component is only generated by the providers associated with the first or the second vehicle component if a predetermined rule is fulfilled.

3. The method of claim 1, wherein the first rank and the second rank are determined using evolving beta distributions having increasing or decreasing mean values, wherein the increasing and decreasing mean values are associated with the rank.

4. The method of claim 3, further comprising:
evolving the beta distribution is performed by updating parameters according predefined rules depending on type of interaction by the user.

5. The method of claim 1, wherein the user interacts with a vehicle component by clicking on a symbol, swiping away from the symbol, no interaction with the symbol, or activation via a sub-menu.

6. The method of claim 1, wherein
the first rank and the second rank are determined in predetermined time steps,
the comparison of the first and second ranks is performed in predetermined time steps, or
the determining of the context cluster is performed in predetermined time steps.

7. The method of claim 1, wherein display displaying of the first functionality symbol or the second functionality symbol is suppressed depending on an input by the user.

8. The method of claim 1, wherein displaying of the first functionality symbol or the second functionality symbol is suppressed as long as the rank for the requests of associated vehicle components falls below a predefined threshold.

9. The method of claim 1, wherein each context cluster comprising one or several types of vehicle component requests refers to a subset of contextual features.

10. The method of claim 9, wherein within each context cluster ranks of requests associated with vehicle components are stored or evolved individually.

11. The method of claim 9, wherein rank of a request associated with an identical vehicle component are implemented at a same time in several context clusters and are evolved individually.

12. The method of claim 1, wherein the context cluster is established by training a neural network.

13. The method of claim 1, wherein multiple context clusters are arranged in cluster ensembles, wherein each cluster ensemble is processed in a separate kernel in parallel with other cluster ensembles.

14. The method of claim 13, wherein a subset of contextual features is assigned to each cluster ensemble, wherein context clusters in each of these cluster ensembles refer to the subset of contextual features.

15. The method of claim 1, wherein at least one static functionality symbol of a further vehicle component is displayed on the home screen, and wherein the at least one static functionality symbol is always displayed in a non-adaptable manner or adaptable by retracting size.

16. The method according to claim 15, wherein the at least one static functionality symbol of a further vehicle component is adapted in size, if a symbol associated with a further vehicle function requested by a provider with higher rank than a static default rank has to be shown on the display area with limited space.

17. A display device of a vehicle for displaying an individual home screen, the display device comprising:
a display screen; and
at least one electronic computing device coupled to the display screen, wherein the at least one electronic computing device is configured to
receive at least a first request generated by a provider associated with a first vehicle component regarding a consideration for displaying a first functionality symbol of the first vehicle component;
receive at least a second request generated by a further provider associated with a second vehicle component regarding a consideration for displaying a second functionality symbol of the second vehicle component;
determine a context cluster using current context data of the vehicle;
determine a first rank for the first request of the first vehicle component in the context cluster and determining a second rank for the second request of the second vehicle component in the context cluster;
compare the first rank with at least the second rank determined for the context cluster; and
display the individual home screen assigned to the display device with
the first functionality symbol having a higher priority than the second functionality symbol responsive to the first rank being greater than the second rank, or
the second functionality symbol having a higher priority than the first functionality symbol responsive to the second rank being greater than the first rank, wherein the first rank is determined depending on a type and frequency of interaction performed by a user relating to the first vehicle component of the context cluster, and wherein the second rank is determined depending on a type and frequency of interaction performed by the user relating to the second vehicle component of the context cluster.

* * * * *